United States Patent
Bolger et al.

(10) Patent No.: US 10,021,194 B2
(45) Date of Patent: Jul. 10, 2018

(54) ENFORCED REGISTRY OF COOKIES THROUGH A THEME TEMPLATE

(71) Applicant: INTERNATIONAL BUSINESS MACHINES CORPORATION, Armonk, NY (US)

(72) Inventors: Rosa M. Bolger, Austin, TX (US); Yaser K. Doleh, North Royalton, OH (US); Mauro Marzorati, Lutz, FL (US); Marc Wisniewski, Port Chester, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 156 days.

(21) Appl. No.: 15/226,031

(22) Filed: Aug. 2, 2016

(65) Prior Publication Data
US 2018/0041589 A1    Feb. 8, 2018

(51) Int. Cl.
| | |
|---|---|
| G06F 15/16 | (2006.01) |
| H04L 29/08 | (2006.01) |
| H04L 29/12 | (2006.01) |
| H04L 29/06 | (2006.01) |

(52) U.S. Cl.
CPC ........ *H04L 67/146* (2013.01); *H04L 61/1511* (2013.01); *H04L 63/0281* (2013.01); *H04L 67/02* (2013.01); *H04L 67/025* (2013.01); *H04L 67/22* (2013.01); *H04L 67/34* (2013.01)

(58) Field of Classification Search
CPC .... H04L 67/02; H04L 67/146; H04L 63/0281
See application file for complete search history.

(56) References Cited

U.S. PATENT DOCUMENTS

| | | | | |
|---|---|---|---|---|
| 8,578,036 | B1* | 11/2013 | Holfelder | G06F 17/30864 709/204 |
| 9,100,365 | B2 | 8/2015 | Manani et al. | |
| 2004/0044768 | A1* | 3/2004 | Takahashi | H04L 29/06 709/225 |
| 2006/0075330 | A1* | 4/2006 | Guido | G06F 17/243 715/226 |
| 2008/0215675 | A1* | 9/2008 | Kaminitz | G06F 17/30861 709/203 |
| 2009/0106349 | A1 | 4/2009 | Harris | |
| 2009/0193129 | A1* | 7/2009 | Agarwal | H04L 63/0281 709/229 |
| 2010/0132029 | A1* | 5/2010 | Chauhan | H04L 63/0227 726/12 |
| 2012/0317652 | A1* | 12/2012 | Kiley | G06F 17/30867 726/27 |
| 2014/0304393 | A1* | 10/2014 | Annamalaisami | H04L 43/04 709/224 |
| 2014/0379790 | A1* | 12/2014 | Watanabe | G06F 17/30893 709/203 |

(Continued)

*Primary Examiner* — Hieu Hoang
(74) *Attorney, Agent, or Firm* — Griffiths & Seaton PLLC

(57) ABSTRACT

Embodiments for enforced registry of cookies through a theme template in a computing network by at least a portion of a processor. A theme template associated with an application may be downloaded. Cookie registration information may be obtained from a registry such that the registry enables an enforcement proxy downloaded with the theme template to enforce compliance with the cookie registration information for each cookie requesting access to the application.

20 Claims, 8 Drawing Sheets

(56) References Cited

U.S. PATENT DOCUMENTS

| | | | |
|---|---|---|---|
| 2015/0082029 A1* | 3/2015 | Volchok | H04L 9/0819 |
| | | | 713/164 |
| 2016/0173615 A1 | 6/2016 | Pattan | |
| 2017/0093917 A1* | 3/2017 | Chandra | H04L 63/20 |
| 2017/0104687 A1* | 4/2017 | Peterson | H04L 47/70 |

* cited by examiner

ENFORCED REGISTRY OF COOKIES THROUGH A THEME TEMPLATE

BACKGROUND OF THE TECHNOLOGY

Field of the Technology

The present technology relates in general to computing systems, and more particularly to, various embodiments for enforced registry of cookies through a theme template using a computing processor.

Description of the Related Art

Computing systems may be found in the workplace, at home, or at school. Computing systems may include computing and data storage systems to process and store data. Within computing systems, internet cookie is a technology that allows a website server storing a small amount of data into hard disk or memory of a client, or reading data from hard disk of a client. Because of its simplicity, Internet cookie technology has made browsing a web page much easier. Almost every webmaster uses cookies both for providing a superior browsing environment for visiting users, and for collecting information of the visiting users more accurately.

SUMMARY OF THE TECHNOLOGY

Various embodiments for enforced registry of cookies through a theme template by at least a portion of one or more processors, are provided. In one embodiment, by way of example only, a method for enforced registry of cookies through a theme template, again by a processor, is provided. A theme template associated with an application may be downloaded to a client browser. Cookie registration information may be obtained from a registry such that the registry enables an enforcement proxy downloaded with the theme template to the client browser to enforce compliance with the cookie registration information for each cookie requesting access to the application.

BRIEF DESCRIPTION OF THE DRAWINGS

In order that the advantages of the technology will be readily understood, a more particular description of the technology briefly described above will be rendered by reference to specific embodiments that are illustrated in the appended drawings. Understanding that these drawings depict only typical embodiments of the technology and are not therefore to be considered to be limiting of its scope, the technology will be described and explained with additional specificity and detail through the use of the accompanying drawings, in which.

DETAILED DESCRIPTION OF THE DRAWINGS

Figure 1:
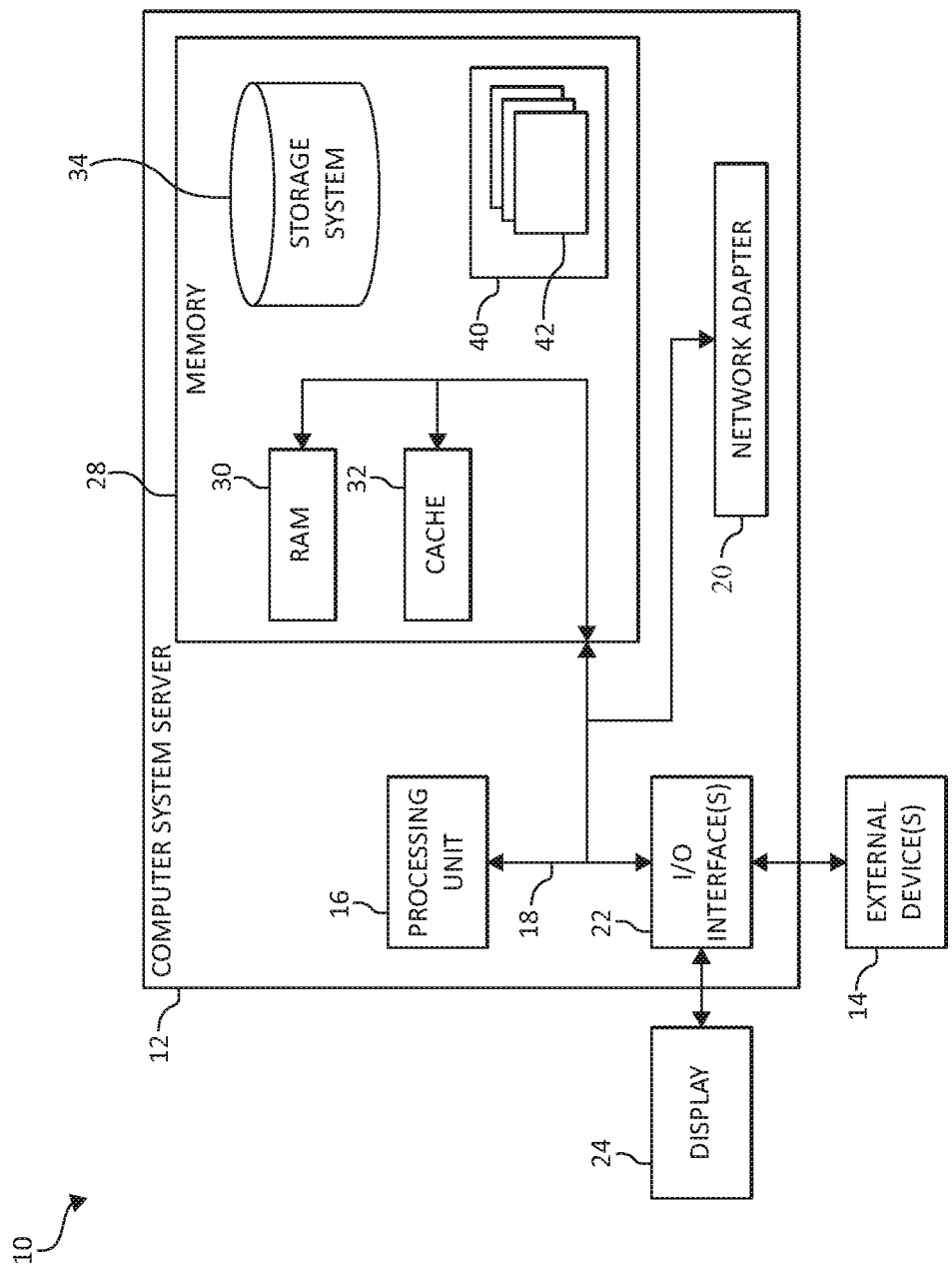
FIG. 1 is a block diagram depicting an exemplary cloud computing node according to an embodiment of the present technology.

Before the present technology is disclosed and described, it is to be understood that this technology is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flowcharts and processes are provided for clarity in illustrating steps and operations and do not necessarily indicate a particular order or sequence.

In one aspect, as described herein, a cookie may be a small text file stored by a web browser on a user's computer. A cookie may contain information that identifies each user, such as user names and passwords. When a user revisits a web browser, for example, a web server may establish the user's identity by the cookie. More specifically, a cookie may be a hypertext transfer protocol (HTTP) cookie (e.g., web cookie, internet cookies or cookied) that are packets of text that an HTTP server sends to an HTTP client as part of a response. Cookies may be identified by a unique name, and the server domain and a path within the server domain. The client may store the cookies it receives. When the client accesses the server again with an HTTP request, the client attaches to the request any cookies stored for the server domain and path. Cookies may allow servers to maintain specific information about a particular client. Examples of cookie content may include session and/or authentication information, tracking information for usage statistics, user specific site preferences, and dynamic content, such as a shopping cart. A cookie may also specify an expiration date and a flag that it may be sent by the client only when the connection is secure.

Current challenges involving cookies include cookie collisions and inadvertent session hijacking ("cookie hijacking") by unrelated web applications operating in a given namespace. For example, independent application owners operating within a single domain (e.g., example.com) often times choose session cookie settings that collide with each other, through the careless choice of a Cookie Name and Cookie Domain. This causes cookie collisions where one application stomps and interferes on an alternative application's tracking operation leading unsatisfactory user experiences within the computing system.

Accordingly, the present technology provides a solution to manage, track and enforce the setting or adjusting of cookie values to ensure uniqueness within a given namespace. In one aspect, the present technology provides for enforced registry of cookies in a tiered delivery network to prevent spurious cookies from being set by rogue applications in a tiered delivery network environment, such as when a reverse proxy is used between the client and the server in a web-based architecture. Thus, an enforcement system or "enforcement proxy" may be embodied as a client browser mechanism that is downloaded as part of a theme template and may execute within the client's browser context. The enforcement system or "enforcement proxy" can operate both as the cookies are set/received or operate in a clean-up mode to remediate existing stored cookies.

In one embodiment, by way of example only, a method for enforced registry of cookies through a theme template, again by a processor, is provided. A theme template associated with an application may be downloaded to a client browser. Cookie registration information may be obtained from a registry such that the registry enables an enforcement system or "enforcement proxy" downloaded with the theme template to the client browser to enforce compliance with the cookie registration information for each cookie requesting access to the application and/or associated with an application, such as a web page. The registry may be embodied within a resilient data store, such as, for example, a domain name system (DNS) or a resilient web service. The enforcement system or "enforcement proxy" can be downloaded on demand along with the theme template and operate on a client browser. In one aspect, the DNS may be a hierarchical decentralized naming system for computers, services, or any resource connected to the Internet or a private network. The DNS may associate various information with domain names assigned to each of the participating entities. Most prominently, the DNS may translate more readily memorized domain names to the numerical IP addresses needed for the purpose of locating and identifying computer services and devices with the underlying network protocols. Thus, the registry of the present technology may be within a data store of the DNS.

It should also be noted that data may be processed through a variety of geographically disbursed computing components, where, for example, a local node may contain a set of data processing components yet remain in remote communication with other portions of the distributed data processing system. To wit, a user's data may not be locally stored or processed on the user's local computer, but is instead hosted by one or more distributed storage components that are in remote communication with the local computer. This type of data storage may, in some cases, be referred to as "cloud," or "cloud-based" storage.

It is understood in advance that although this disclosure includes a detailed description on cloud computing, implementation of the teachings recited herein are not limited to a cloud computing environment. Rather, embodiments of the present technology are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the technology described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the technology.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the technology as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
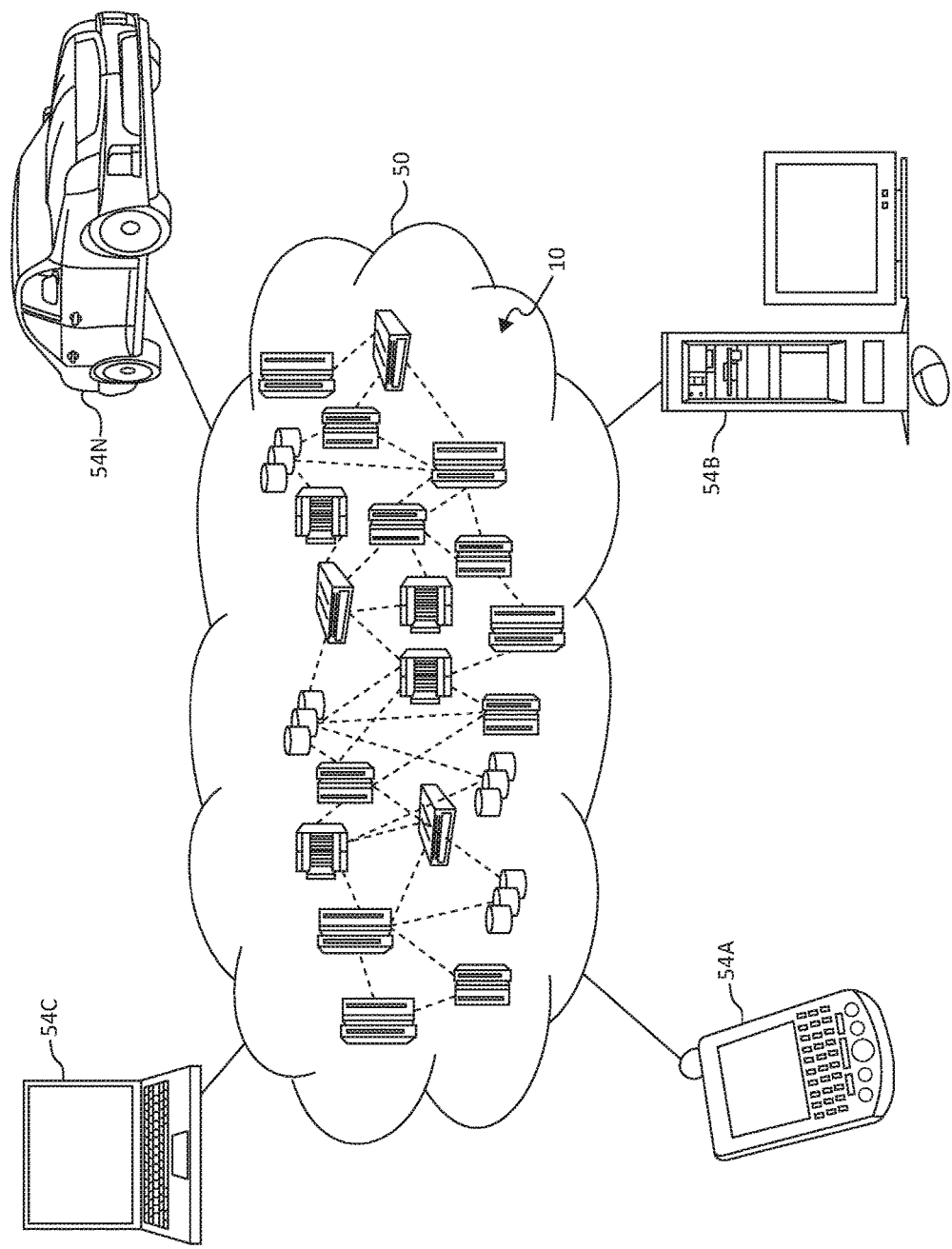
FIG. 2 is an additional block diagram depicting an exemplary cloud computing environment according to an embodiment of the present technology.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
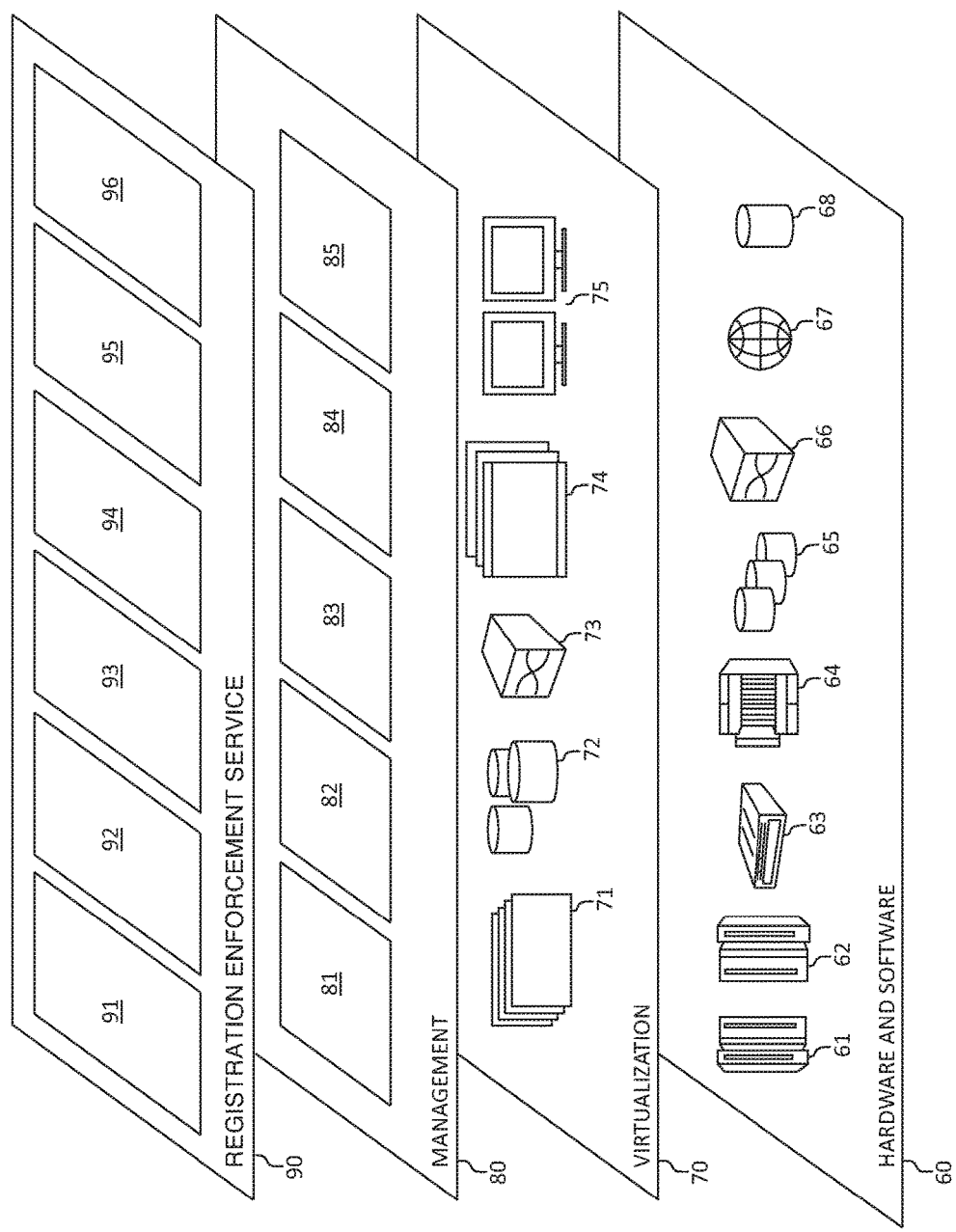
FIG. 3 is an additional block diagram depicting abstraction model layers according to an embodiment of the present technology.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the technology are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 or (aka "registration enforcement services layer") provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present technology, various image processing workloads and functions 96. In addition, enforced registry of cookies workloads and functions 96 may include such operations as extracting cookie information functionality, enforcement compliance functionality, comparison and matching analytics, cookie registration rules analysis, suppressing cookies from being relayed to an application, and as will be further described, user and device management functions. One of ordinary skill in the art will appreciate that the registration enforcement services workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present technology.

As previously mentioned, the mechanisms of the illustrated embodiments provide novel approaches for managing, tracking and enforcing the setting or adjusting of cookie values to ensure uniqueness within a given namespace, among other aspects, suppressing the cookie from being created or downloaded with an application upon determining the cookie information obtained with the application (e.g., a web page of a web browser) is non-compliant with the cookie registration information, and other factors based, at least in part, on the cookie registration information obtained from a registry such that the registry enables the reverse proxy to enforce compliance with the cookie registration information for each cookie requesting access to the application.

As will be further described, in addition to mechanisms for enforcing cookie registration, other aspects of the mechanisms of the illustrated embodiments may include the following. The functionality may include methodologies for obtaining cookie registration information from the registry such that the registry enables an enforcement proxy downloaded with the theme template to enforce compliance with the cookie registration information for each cookie requesting access to the application. A comparison operation may be executed such that a determination is made as to whether cookie instructions or information associated with an application (e.g., web application or "web page") matches the cookie registration information retrieved from the registry. A cookie may be created according to the cookie registration information obtained from the registry upon the enforcement proxy validating instructions received with the application correspond to the cookie registration information. A cookie may be adjusted, manipulated, and/or reset according to the cookie registration information obtained from the registry upon the enforcement proxy validating instructions received with the application correspond to the cookie registration information. Alternatively, all and/or at least a portion of the application may be suppressed according to the cookie registration information upon determining by the enforcement proxy at least a portion of the application is non-compliant with the cookie registration information.

Figure 4:
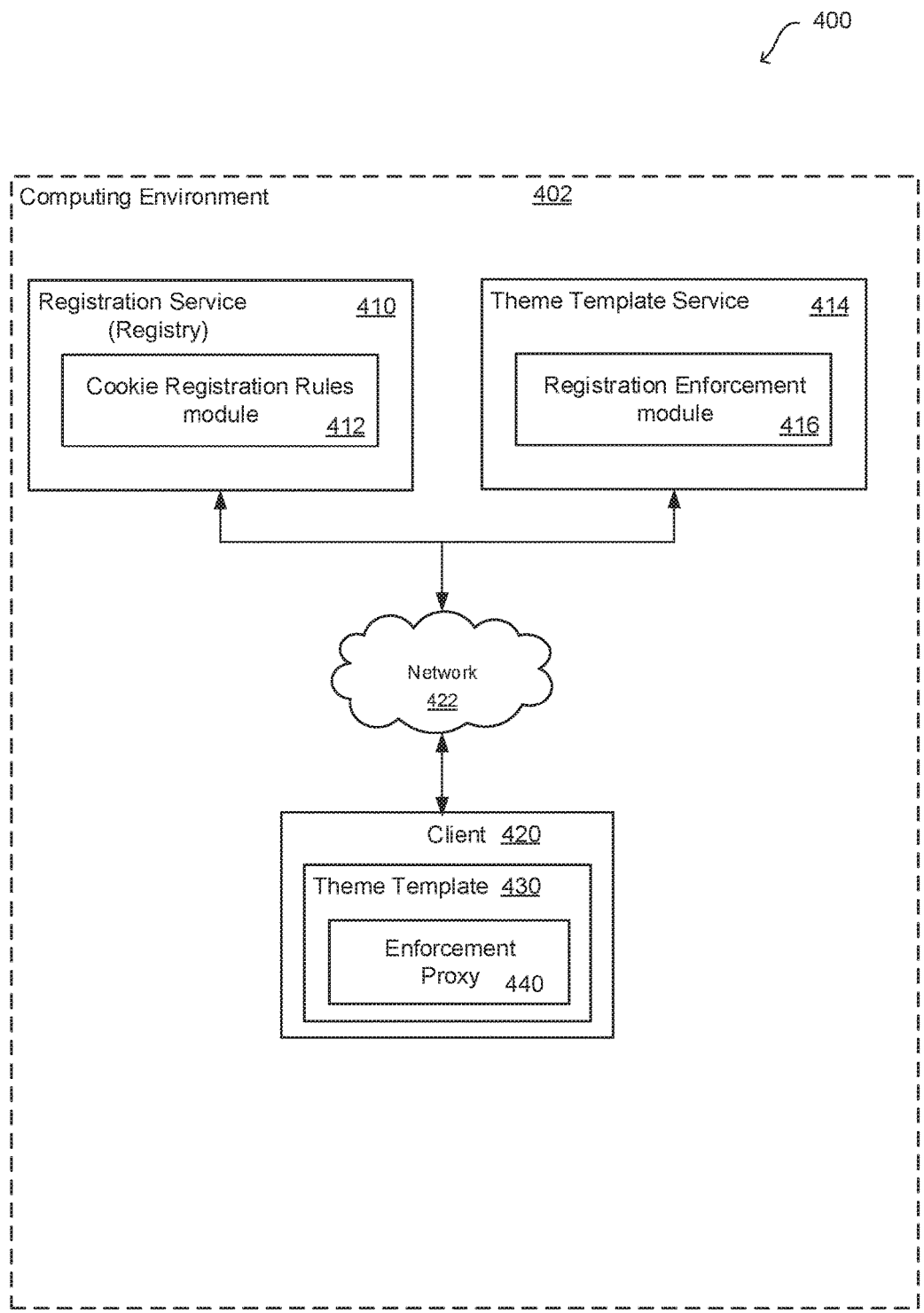
FIG. 4 is an additional block diagram depicting various user hardware and cloud computing components functioning in accordance with aspects of the present technology.

Turning now to FIG. 4, a block diagram depicting exemplary functional components 400 according to various mechanisms of the illustrated embodiments, is shown. FIG. 4 illustrates one or more functions, workloads, and/or protocols for Cookie Registry Enforcement Protocol (CREP). In one aspect, each of the components, modules, and/or functions described in FIGS. 1-3 may also apply to the components, modules, and functions of FIG. 4. For example, in one aspect, the computing environment 402 may include computer system/server 12, incorporating processing unit 16 to perform various computational, data processing, workloads, and other functionality in accordance with various aspects of the present technology. As one of ordinary skill in the art will appreciate, the depiction of the various functional units in computer system/server 12 in FIG. 1 is for purposes of illustration of the figures as described herein as FIG. 4, as the functional units may be located within computer system/server 12 or elsewhere within and/or between distributed computing components. In one aspect, the computing environment 402 may provide virtualized computing services (i.e., virtualized computing, virtualized storage, virtualized networking, etc.). More specifically, the computing environment 402 may include and/or be associated with a virtual computing environment that provides virtualized computing, virtualized storage, virtualized networking and other virtualized services that are executing on a hardware substrate.

In one aspect, the computing environment 402 may include a registration service 410 in order to allow registration of cookie registration information, such as, for example, profiles, rules, requirements, or parameters. The registration service 410 may also include a cookie registration rules module 412. The computing environment 402 may also include a theme template service 414, which may include a registration enforcement module 416 to enforce that each cookie is compliant with one or more cookie information. Also, the computing environment 402 may provide data communication between the registration service 410, theme template service 414, and/or client 420 via the network 422.

In one aspect, CREP of the computing environment 402 may employ one or more various mathematical operations (e.g., using addition, subtraction, division, multiplication, standard deviations, means, averages, statistical modeling using statistical distributions, etc.) and undergo various data analytics functions. As part of the CREP, a client, such as client 420, may access a web browser or web page via a web server. The theme templates service 414 may function and operate on a theme template server (and/or on an application server) and may download a theme template to the client 420 (e.g., a client browser). The downloaded theme template 430 on the client 420 may include an enforcement proxy 440 (or "enforcement service"). The client 420 may receive cookie instructions from the web server or "web page" instructing the client 420 about creating a cookie. However, the enforcement proxy 440, using cookie registration rules module 412, may obtain information of one or more cookies that may be extracted by the enforcement proxy 440 (e.g., theme template service 414). The registration enforcement module 416 may obtain the cookie registration rules or requirements from the cookie registration rules module 412, which have been provided to a registry of the registration service 410 by an application on the application server (not shown) such that the registry enables the enforcement proxy to enforce compliance with the cookie registration rules for the one or more cookies requesting access to the application of the application server (not shown). The registration enforcement module 416 may compare in order to match the extracted information of the one or more cookies against the cookie registration rules obtained from the cookie registration rules module 412 provided to the registry (e.g., registration service 410) by the application.

The enforcement proxy 440 may create a cookie according to the cookie registration information obtained from the registration enforcement module 416 upon the enforcement proxy 440 validating cookie instructions received with an application (e.g., a web page or web-browser) correspond to the cookie registration information received from the registration enforcement module 416. The cookie registration information received from the registration enforcement module 416 may include at least one of a plurality of rules, parameters, profiles, selectors, paths, or cookie names.

In an additional aspect, the enforcement proxy 440 may suppress, manipulate, and/or adjust at least a portion of the application according to the cookie registration information obtained from the registration enforcement module 416 upon determining by the enforcement proxy 440 at least a portion of an application (e.g., a web page or web-browser) is non-compliant with the cookie registration information obtained from the registration enforcement module 416.

Consider the following example of an implementation of the aforementioned functionality. A theme template 430 associated with an application may be downloaded from the theme template service 414 on a server (e.g., an application server and/or a theme template server) to a client, such a client browser 420. The cookie registration information may be obtained from a registry (e.g., registration service 410) such that the registry enables an enforcement proxy 440 downloaded with the theme template 430 to the client browser to enforce compliance with the cookie registration information for each cookie related to an application (e.g., a web page).

In one aspect, an application server (not shown) may enter specific cookie information and/or requirements into the registration service 410, or more specifically, the cookie registration rules. The registration enforcement module 416 may require each cookie be compliant with the cookie registration rules. That is, registration enforcement module 416 of cookies may be embodied within the theme template service 414 and used to download the enforcement proxy 440 to the client browser, whereas an actual registry may be embodied within a registration service 410. The registry may be a resilient data store within a domain name system (DNS) and/or a web service. For example, the DNS may use domain keys identified mail (DKIM) syntax and/or a hypertext transport protocol (HTTP) may use the web service or may employ a JavaScript Object Notation (JSON) object. The registration of the cookie rules, which may be located in the cookie registration rules module 412, may include a cookie name, host domain, path, profiles, and/or attributes. That is, the registration service 410 (e.g., registry) does contain the cookies, but rather, the registry may only include the cookie registration information, such as, for example, profiles, attributes, rules, requirements, or parameters for a cookie. For example, if the registry is a DNS, then the selector, name, and path may be indicated as (_selector._crep.domain 86400 IN TXT "v=CREP1 name=cookienameissuer=www-ext.ibm.com.cs186.net path=/account/us/en/domain=www.ibm.com). In an additional example, if the registry is provided by a web service, then the selector, name, and path may be indicated as the information in the text record as "URL https://domain/crep/selector", which may be indicated as a JSON object. An application compliant with the registration service may issue cookies with overload path and domain tokens. The domain token may point to the domain value in the registry and the path may point to the selector where "slashes" may be replaced with "dashes" (e.g., Set-Cookie: cookiename=cookievalue; path=/selector; domain=www.ibm.com; expires=Tue, 1 Jan. 1970 00:00:00). The enforcement proxy 440 operating as an enforcement component may extract the selector, path and cookie name from the Set-Cookie header and may perform a corresponding lookup in the registration service 410.

It should be noted that an application owner that issued a cookie may be matched with an application in the registry and the cookie information extracted from the registry may be used to construct a Set-Cookie header that matches the registered details (e.g., Set-Cookie: cookiename=cookievalue path=/account/us/en/domain=www.ibm.com).

Figure 5:
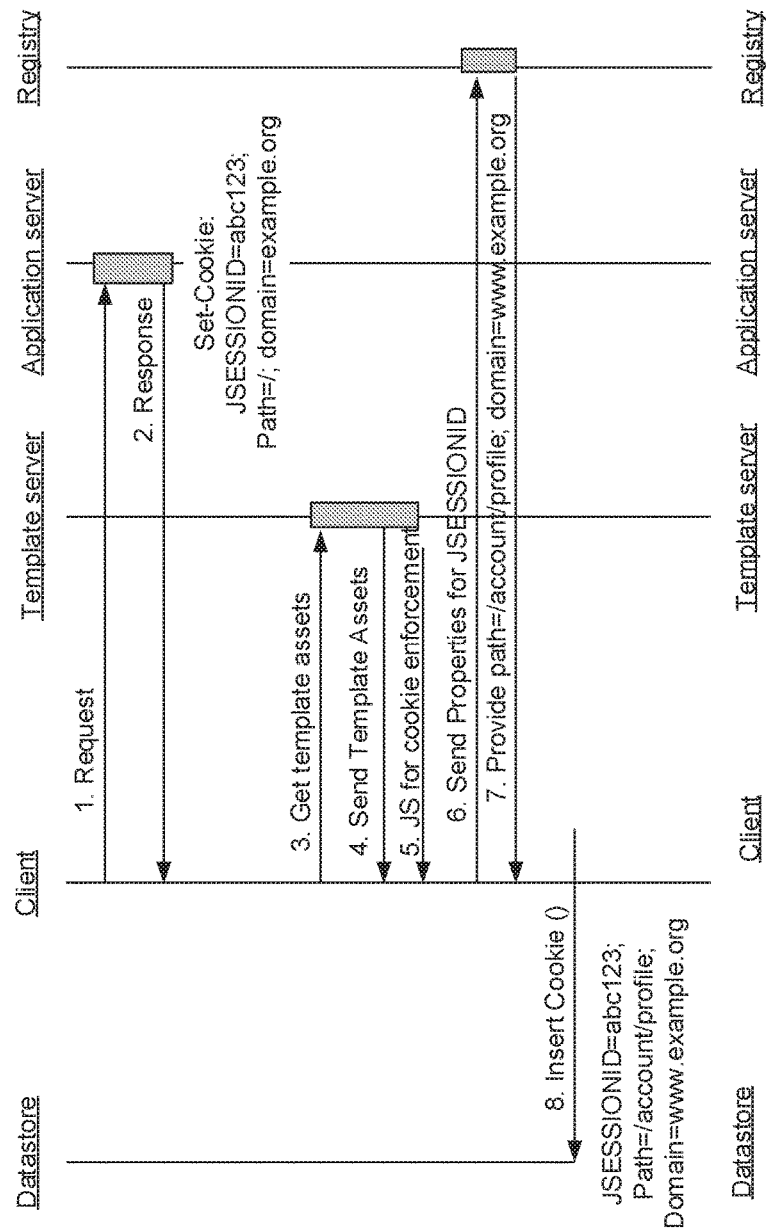
FIG. 5 is a flow diagram depicting an exemplary method for validating cookies in which aspects of the present technology may be realized.

Turning now to FIG. 5, a flow diagram depicting exemplary functional components 500 according to various mechanisms of the illustrated embodiments, is shown. FIG. 5 illustrates one or more functions, workloads, and/or protocols for Cookie Registry Enforcement Protocol (CREP). That is, FIG. 5 is a flow diagram depicting an exemplary method for validating cookies.

In one aspect, each of the components, modules, and/or services described in FIGS. 1-4 may also apply to the components, modules, and services of FIG. 5. The components, modules, and/or functions described in FIG. 5 may include a data store (e.g., a local cookie data store), a client (e.g., a client browser), a template server, an application server, and/or a registry. Consider the following example of an implementation of the functionality of FIG. 5. For example, 1) a client may send a request for an application (e.g., a web page) to be downloaded at a client browser. The web page may include one or more theme templates. That is, the client may access a web page which may include references to additional objects (e.g., template assets) that need to be downloaded for a proper and complete rendering of the web page, such as Cascading Style Sheets (CSS), JavaScript (JS), images and the like. These additional objects that control the presentation layer of the page have been enhanced with executable code that the client browser will execute subsequently on the current and follow-on pages, this is the Enforcement component. 2) The application server may issue a response with the application (or web page) to be downloaded at the client. The response may include cookie instructions. That is, upon receipt of a web page containing a "Set-Cookie header", an enforcement component or enforcement proxy on the client browser may extract a selector, path and cookie name from the Set-Cookie header (e.g., Set-Cookie: JSESSIONID=abc123; path=/; domain=*.example.org). The application server may include in the response a set-cookie indication, such as, for example, a "JSESSIONID" is equal to "abc123". The path may be equal to "/" and the domain may be set equal to "domain=example.org". (In one aspect, a JESSIONID may be an identification 'ID' generated by a servlet container and used for session management in a J2EE web application for a hypertext transfer protocol (HTTP). The JSESSIONID may be sent to a client either within a cookie and/or as part of a uniform resource locator (URL), used only if cookies are disabled on the browser.)

3) The template server may send template assets in order to build a web page to the client. More specifically, either in parallel with and/or subsequent to downloading the web page, the theme template may be downloaded from the template server. The enforcement proxy on the client browser may perform a lookup operation on the registry using either asynchronous JavaScript and XML or Asynchronous JavaScript and XML "AJAX" methods, or DNS methods depending on the type of registry being employed. However, AJAX may request the client to "get the template assets" from the template server.

4) The template server issues back to the client a template asset. 5) The template server may issue back to the client browser properties for the JS for cookie enforcement. The client browser may send properties to the JSESSIONID (e.g., http://registry.example.org/getCookieDetails?cookieName=JSESSIONID&cookieDomain=example.org). In one aspect, the template assets (e.g., those items necessary to build a web page, such as images) may be sent together with the JavaScript (JS) for cookie enforcement. In short, the enforcement proxy may be included with the template assets. 6) The client may send to the registry the information (e.g., properties) for the JSESSIONID as received by the application server in step 2 above (e.g., Set-Cookie: JSESSIONID=abc123; path=/; domain=*.example.org). In other words, the client is requesting from the registry the allowable cookie properties (e.g., the allowable cookie properties for JSESSIONID). 7) The registry may respond back to the client with the allowable cookie properties. For example, the registry may indicate that the allowable cookie properties for JSESSIONID is only account, profile, path, and the domain is "www.example.org and not just example.org, which may be represented, for example, as path=/account/profile; domain=www.example.org. That is, the registry returns the profile for a corresponding lookup to the registry. For example, the cookie properties may be represented using pseudocode in the form of:

```
cookieProperties ({
"JSESSIONID": {
"status": "allowed",
"path": "/account/profile",
"expires": "session",
"domain": www.example.org,
"secure": "true",
"httpOnly": "false:
}
})
```

In cases where the registry does not return any cookie information or details, a default operation may include altering and/or adjusting the "path" and "domain" to ensure that an application cannot set a cookie outside of its delegated name space. The values from the request URL may be used. Specifically, the "path" may be set, for example, to the requested URL up to a rightmost "/". The "domain" may be set, for example, to be that of a fully qualified domain name "FQDN" in the request URL. 8) The client may execute instructions to create the cookie, which may be an insert the cookie properties JavaScript (JS) call (e.g., "cookieProperties ( )") and create a cookie. In other words, the client may execute the instructions to create cookie and insert the JS call according to the allowable parameters provided by the registry. Thus, as illustrated in FIG. 5, the values of JSESSIONID of "abc123" received from the application server match the JSESSIONID of "abc123" as indicated in the registry. However, the path and the domain differ. The enforcement proxy downloaded on demand with the theme template to the client browser, enforces the cookie compliance for creating the cookie according to the cookie registration provided by the registry.

That is, the cookie information extracted from the registry may be used to construct a JavaScript call to create a cookie that matches the registered details, such as, for example document.cookie="JSESSIONID=abc123; path=/account/profile; domain=www.example.org; secure". However, it should be noted that one or more attributes may be suppressed according to an indication from the registry. For example, "Expires" and "httpOnly" attributes (as illustrated above) may be suppressed since the registry provided an indication to suppress such attributes, even if the values were not set in a received Set-Cookie header.

In one aspect, the enforcement proxy on the client browser may manipulate the cookie at the proxy with a compliant set-cookie header according to the cookie registration rules to enforce compliance. The cookie registration information may include at least a cookie name, a host domain, and a path to enforce compliance for each cookie. The registry may be located within data store of a Domain Name System (DNS) or a web service. The enforcement proxy may use various analytic functions or workflows to analyze the set-cookie header received in the response. Also, the registry (e.g., a DNS or web service) may provide the registered cookie details, rules, and/or regulations parameters for creating the cookies.

Figure 6:
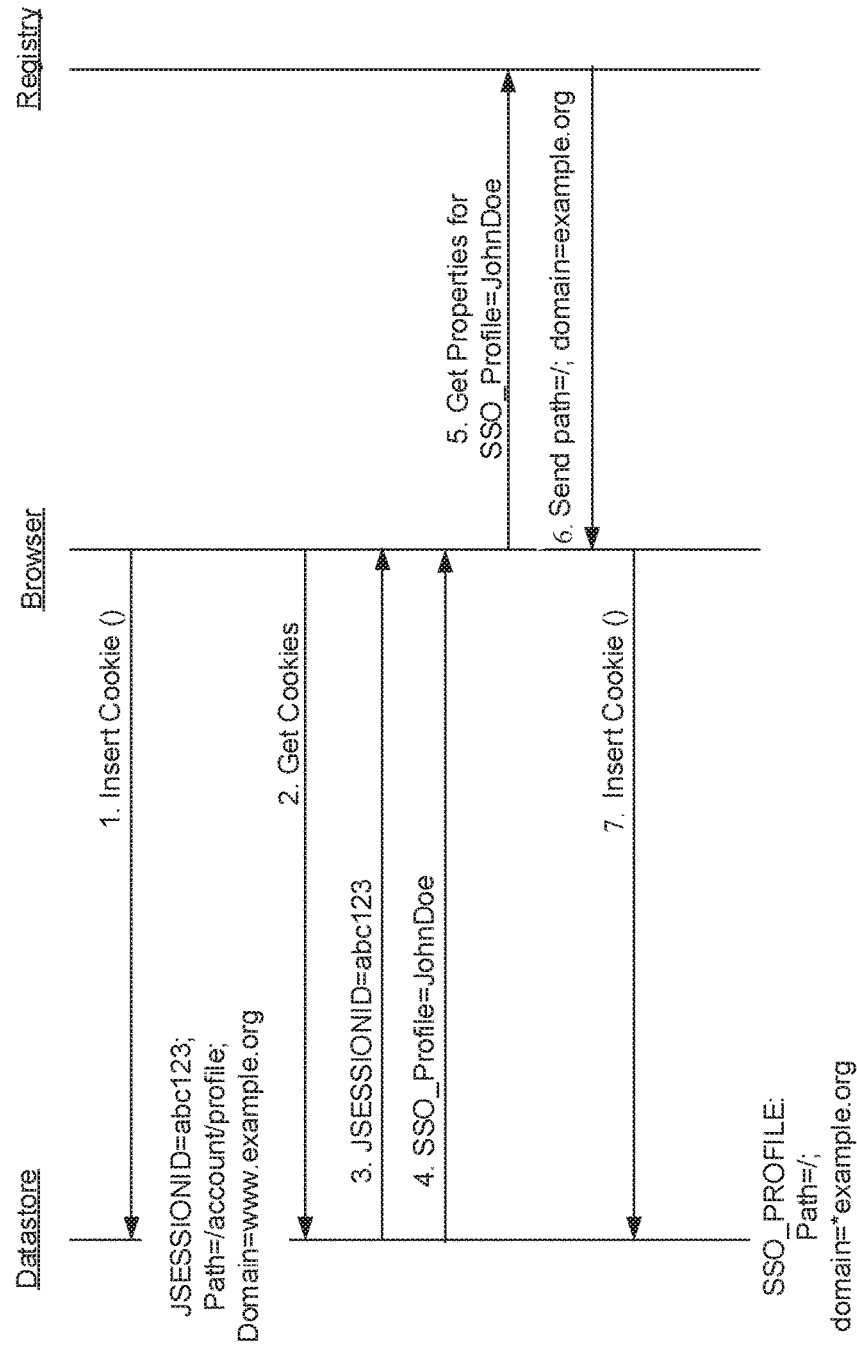
FIG. 6 is a flow diagram depicting an exemplary method for cleaning a local cookie data store in which aspects of the present technology may be realized.

Turning now to FIG. 6 a flow diagram is depicted for cleaning a local cookie data store. In one aspect, each of the components, modules, and/or services described in FIGS. 1-5 may also apply to the components, modules, and services of FIG. 6. Consider following example of an implementation of the functionality of FIG. 6, which may be an option that runs concurrently with FIG. 5 and/or as a separate operation. 1) As an option, the client browser may insert or send a created cookie to the data store. That is, the client may access a web page which may include references to additional objects that need to be downloaded for a proper and complete rendering of the web page, such as Cascading Style Sheets (CSS), JavaScript (JS), images and the like. 2) The client may send a request to the datastore to retrieve all cookies in the data store (e.g., var cookies=document.cookie;). The enforcement proxy downloaded with the theme template (as described in FIG. 5) may be used to maintain and ensure the data store is clean and contains cookies compliant with the registry. 3) The datastore may send to the client browser the cookies and cookie information for each cookie. For example, using the JSESSIONID as described in FIG. 5, the datastore may send to the client browser JSESSIONID=abc123. The datastore may return all cookies in one string, such as, for example: JSESSIONID=abc123; SSO_PROFILE=JohnDoe; cookie3=value; cookie4=value; cookie3=value; 4) The datastore may also send the cookie profiles and attributes, such as, for example SSO_Profile=JohnDoe. 5) The client browser requests from the registry all cookie information (e.g., details, profiles, attributes, etc.) from the registry for each cookie. That is, the enforcement proxy may send AJAX calls or DNS calls to the registry for each cookie (e.g., retrieve from the registry the properties for a profile, such as "SSO_Profile=JohnDoe"). For example, a first call may be of the form http://registry.example.org/getCookieDetails?cookieName=JSESSIONID&cookieDomain=example.org, a second call may be of the form http://registry.example.org/getCookieDetails?cookieName=SSO_PROFILE&cookieDomain=example.org, a third call may be of the form http://registry.example.org/getCookieDetails?cookieName=cookie3&cookieDomain=example.org, and a fourth call may be of the form http://registry.example.org/getCookieDetails?cookieName=cookie4&cookieDomain=example.org.

6) The registry may respond back to the client browser with the allowable cookie properties. For example, the registry may indicate that the allowable cookie properties for SSO_Profile=JohnDoe may be represented, for example, as path=/; domain=example.org. That is, the registry returns the profile for a corresponding lookup to the registry. For example, the cookie properties may be represented using pseudocode in the form of:

```
cookieProperties ({
"JSESSIONID": {
"status": "allowed",
"path": "/account/profile",
"expires": "session",
"domain": www.example.org,
"secure": "true",
"httpOnly": "false:
}
})
```

7) The client may execute instructions to create the cookie, which may be an insert the cookie properties JS call (e.g., "cookieProperties ( )") and create and clean up each cookie according to the received cookie properties. The information extracted from the registry may be used to create a cookie that matches the registered details. For example, document.cookie="JSESSIONID=abc123; path=/account/profile; domain=www.example.org; secure", document.cookie="SSO_PROFILE=JohnDoe; path=/; domain=example.org; secure; httpOnly; Expires=Wed, 23 May 2016 00:00:00 GMT", document.cookie="cookie3=; Expires=Thu, 1 Jan. 1970 00:00:00 UTC", and/or document.cookie="cookie4=; Expires=Thu, 1 Jan. 1970 00:00:00 UTC". In one aspect, one or more cookies may be adjusted, reset, expunged, and/or removed according to the information provided from the registry. Alternatively, if each cookie data in the data store matches the cookie data received from the registry, the enforcement proxy may do nothing and recognize the data store is current with compliant cookies.

As per the example provided in FIG. 6, at least two cookies are identified as being present in the registry and have their settings reset or updated. Alternatively, the other two cookies, which are not identified as being within the registry, may be expunged, such as by setting a pre-expired date for removing cookies.

Figure 7:
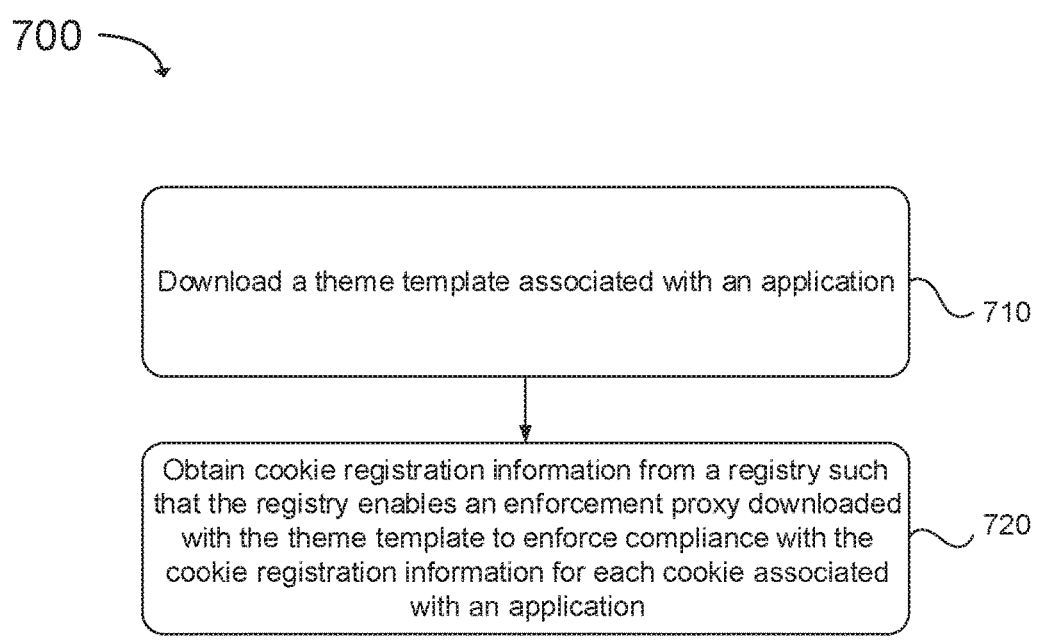
FIG. 7 is a flowchart diagram depicting an exemplary method for enforcing registry of cookies by a processor, in which aspects of the present technology may be realized.

Turning now to FIG. 7, a method 700 for enforced registry of cookies by a processor is depicted, in which various aspects of the illustrated embodiments may be implemented. That is, FIG. 7 is a flowchart of an additional example method 700 for enforced registry of cookies through a theme template of a computing environment according to an example of the present technology. The functionality 700 may be implemented as a method executed as instructions on a machine, where the instructions are included on at least one computer readable medium or one non-transitory machine-readable storage medium. Starting in block 710, a theme template associated with an application may be downloaded. Cookie registration information may be obtained from a registry such that the registry enables an enforcement proxy downloaded with the theme template on a client browser to enforce compliance with the cookie registration information for each cookie associated with an application or web page (requesting access to the web page), as in block 720.

Figure 8:
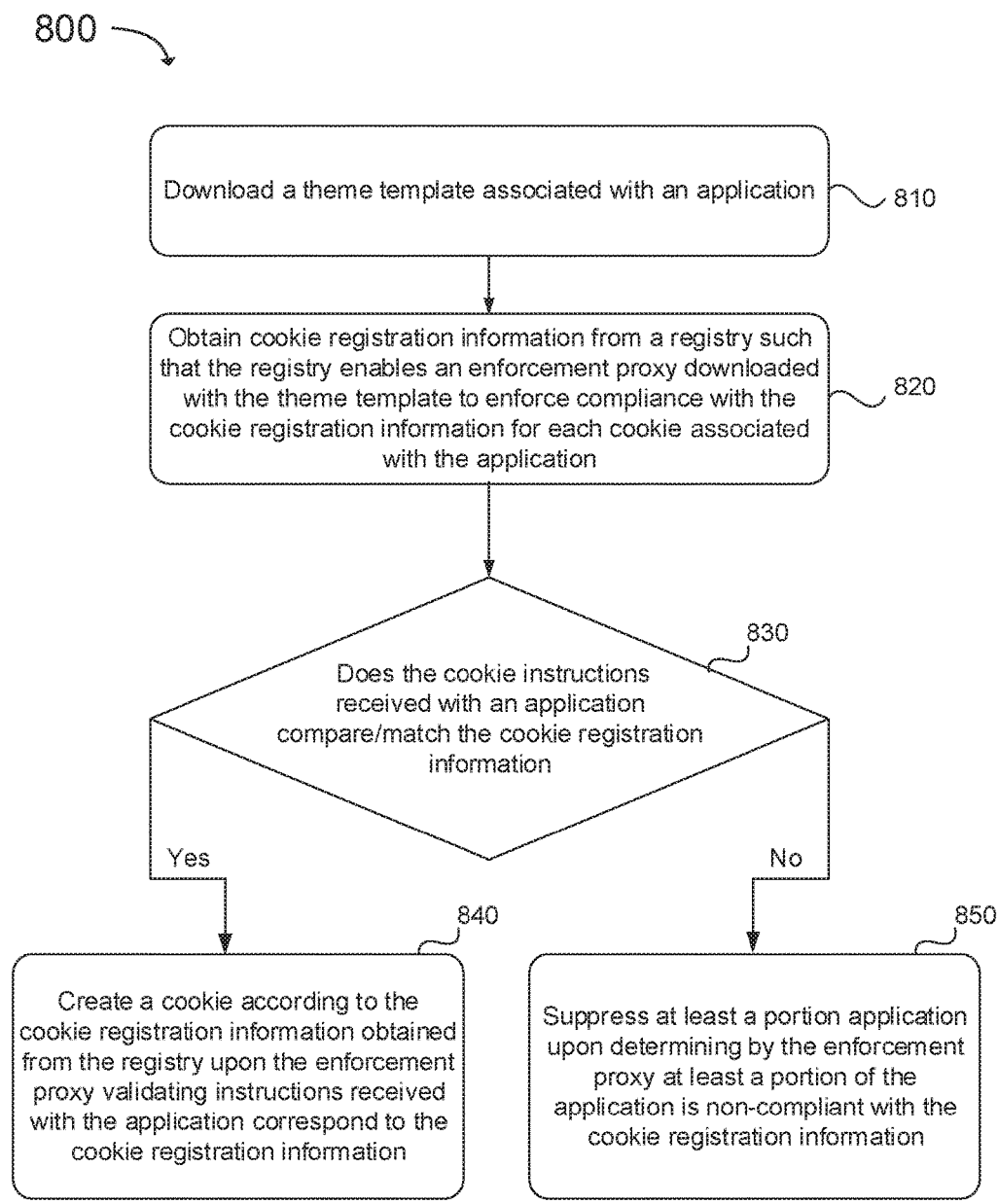
FIG. 8 is an additional flowchart diagram depicting an additional exemplary method for enforcing registry of cookies by a processor, again in which aspects of the present technology may be realized.

Turning now to FIG. 8, a method 800 for enforced registry of cookies by a processor is depicted, in which various aspects of the illustrated embodiments may be implemented. That is, FIG. 8 is a flowchart of an additional example method 800 for enforced registry of cookies in tiered delivery network of a computing environment according to an example of the present technology. The functionality 800 may be implemented as a method executed as instructions on a machine, where the instructions are included on at least one computer readable medium or one non-transitory machine-readable storage medium. Starting in block 810, a theme template associated with an application may be downloaded. Cookie registration information may be obtained from a registry such that the registry enables an enforcement proxy downloaded with the theme template onto a client browser to enforce compliance with the cookie registration information for each cookie requesting access to the application, as in block 820. A comparison operation may be executed such that a determination is made as to whether cookie instructions or information associated with an application (e.g., web application or "web page") matches the cookie registration information, as in block 830. A cookie may be created according to the cookie registration information obtained from the registry upon the enforcement proxy validating instructions received with the application correspond to the cookie registration information, as in block 840. Alternatively, at least a portion of the application may be suppressed according to the cookie registration information upon determining by the enforcement proxy at least a portion of the application is non-compliant with the cookie registration information, as in block 850.

In one aspect, in conjunction with and/or as part of at least one block of FIGS. 7-8, the operations of 700 and/or 800 may include each of the following. The operations of 700 and/or 800 may include downloading, from a theme template server to a client browser, the theme template having the enforcement proxy, the enforcement proxy executes on the client browser. The operations of 700 and/or 800 may also include extracting at least a selector, a path, and cookie name from a set-cookie header included in the application upon downloading the theme template, wherein the cookie registration information includes at least a cookie name, a host domain, and a path to enforce compliance for each cookie requesting access to the application, wherein the registry is located within data store of a Domain Name System (DNS) or a web service. The cookie registration information may include at least one of rules, parameters, profiles, selectors, paths, or cookie names. Cookie enforcement instructions may be received while downloading the theme template to suppress at least a portion of an application downloaded from an application server. The operations of 700 and/or 800 may include a clean-up operation. That is, a clean-up operation may include retrieving by the enforcement proxy one or more cookies from a data store associated with a client browser; resetting cookie settings for those of the one or more cookies retrieved from the data store that are compliant with the cookie registration information; and/or expunging those of the one or more cookies retrieved from the data store that are non-compliant with the cookie registration information.

The present technology may be a system, a method, and/or a computer program product. The computer program product may include a computer readable storage medium (or media) having computer readable program instructions thereon for causing a processor to carry out aspects of the present technology.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technology.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present technology. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for enforced registry of cookies through a theme template in a computing network, comprising:
    downloading a theme template associated with an application; and
    obtaining cookie registration information from a registry, wherein the registry enables an enforcement proxy downloaded with the theme template to enforce compliance with the cookie registration information for each cookie associated with the application.

2. The method of claim 1, further including downloading, from a theme template server to a client browser, the theme template having the enforcement proxy, wherein the enforcement proxy executes on the client browser.

3. The method of claim 1, further including extracting at least a selector, a path, and cookie name from a set-cookie header included in the application upon downloading the theme template, wherein the cookie registration information includes at least a cookie name, a host domain, and a path to enforce compliance for each cookie requesting access to the application, wherein the registry is located within a data store of a Domain Name System (DNS) or a web service.

4. The method of claim 1, further including creating a cookie according to the cookie registration information obtained from the registry upon the enforcement proxy validating instructions received with the application correspond to the cookie registration information, wherein the cookie registration information includes at least one of a plurality of rules, parameters, profiles, selectors, paths, or cookie names.

5. The method of claim 1, further including suppressing at least a portion of the application according to the cookie registration information upon determining by the enforcement proxy at least a portion of the application is non-compliant with the cookie registration information.

6. The method of claim 1, further including receiving cookie enforcement instructions while downloading the theme template to suppress at least a portion of an application downloaded from an application server.

7. The method of claim 1, further including:
    retrieving by the enforcement proxy one or more cookies from a data store associated with a client browser;
    resetting cookie settings for those of the one or more cookies retrieved from the data store that are compliant with the cookie registration information; or
    expunging those of the one or more cookies retrieved from the data store that are non-compliant with the cookie registration information.

8. A system for enforced registry of cookies through a theme template, comprising:
    one or more computers with executable instructions that when executed cause the system to:
    download a theme template associated with an application; and
    obtain cookie registration information from a registry, wherein the registry enables an enforcement proxy downloaded with the theme template to enforce compliance with the cookie registration information for each cookie associated with the application.

9. The system of claim 8, wherein the executable instructions further download, from a theme template server to a client browser, the theme template having the enforcement proxy, wherein the enforcement proxy executes on the client browser.

10. The system of claim 8, wherein the executable instructions further extract at least a selector, a path, and cookie name from a set-cookie header included in the application upon downloading the theme template, wherein the cookie registration information includes at least a cookie name, a host domain, and a path to enforce compliance for each cookie requesting access to the application, wherein the registry is located within a data store of a Domain Name System (DNS) or a web service.

11. The system of claim 8, wherein the executable instructions further create a cookie according to the cookie registration information obtained from the registry upon the enforcement proxy validating instructions received with the application correspond to the cookie registration information, wherein the cookie registration information includes at least one of a plurality of rules, parameters, profiles, selectors, paths, or cookie names.

12. The system of claim 8, wherein the executable instructions further suppress at least a portion of the application according to the cookie registration information upon determining by the enforcement proxy at least a portion of the application is non-compliant with the cookie registration information.

13. The system of claim 8, wherein the executable instructions further receive cookie enforcement instructions while downloading the theme template to suppress at least a portion of an application downloaded from an application server.

14. The system of claim 8, wherein the executable instructions further:
    retrieve by the enforcement proxy one or more cookies from a data store associated with a client browser;
    reset cookie settings for those of the one or more cookies retrieved from the data store that are compliant with the cookie registration information; or expunge those of the one or more cookies retrieved from the data store that are non-compliant with the cookie registration information.

15. A computer program product for, by a processor, enforced registry of cookies, the computer program product comprising a non-transitory computer-readable storage medium having computer-readable program code portions stored therein, the computer-readable program code portions comprising:
   an executable portion that downloads a theme template associated with an application; and
   an executable portion that obtains cookie registration information from a registry, wherein the registry enables an enforcement proxy downloaded with the theme template to enforce compliance with the cookie registration information for each cookie associated with the application.

16. The computer program product of claim 15, further including an executable portion that downloads, from a theme template server to a client browser, the theme template having the enforcement proxy, wherein the enforcement proxy executes on the client browser.

17. The computer program product of claim 15, further including an executable portion that extracts at least a selector, a path, and cookie name from a set-cookie header included in the application upon downloading the theme template, wherein the cookie registration information includes at least a cookie name, a host domain, and a path to enforce compliance for each cookie requesting access to the application, wherein the registry is located within a data store of a Domain Name System (DNS) or a web service.

18. The computer program product of claim 15, further including an executable portion that creates a cookie according to the cookie registration information obtained from the registry upon the enforcement proxy validating instructions received with the application correspond to the cookie registration information, wherein the cookie registration information includes at least one of a plurality of rules, parameters, profiles, selectors, paths, or cookie names.

19. The computer program product of claim 15, further including an executable portion that suppresses at least a portion of the application according to the cookie registration information upon determining by the enforcement proxy at least a portion of the application is non-compliant with the cookie registration information.

20. The computer program product of claim 15, further including an executable portion that:
   retrieves by the enforcement proxy one or more cookies from a data store associated with a client browser;
   resets cookie settings for those of the one or more cookies retrieved from the data store that are compliant with the cookie registration information; or
   expunges those of the one or more cookies retrieved from the data store that are non-compliant with the cookie registration information.

* * * * *